Nov. 17, 1970 W. P. L. WILBY 3,541,245

ELECTROOPTICAL DRUM SCANNERS FOR IMAGE REPRODUCTION PERMITTING VARIABLE IMAGE ENLARGEMENT OR REDUCTION

Filed May 5, 1967 3 Sheets-Sheet 1

Inventor
William P. L. Wilby
By
Kemon, Palmer, Stewart & Estabrook
Attorneys

Inventor
William P. L. Wilby
By
Kemon, Palmer, Stewart & Estabrook
Attorneys

Inventor
William P. L. Wilby
By
Kemon, Palmer, Stewart & Estabrook
Attorneys 3,541,245

ELECTROOPTICAL DRUM SCANNERS FOR IMAGE REPRODUCTION PERMITTING VARIABLE IMAGE ENLARGEMENT OR REDUCTION

William Peter L. Wilby, London, England, assignor to Crosfield Electronics Limited, London, England, a British company Filed May 5, 1967, Ser. No. 636,474
Claims priority, application Great Britain, May 9, 1966, 20,509/66
Int. Cl. H04n 5/84
U.S. Cl. 178—6.7 4 Claims

ABSTRACT OF THE DISCLOSURE

In image reproducing apparatus, variable enlargement or reduction is obtained with a drum scanner by sampling signals derived from a head scanning an original on the scanner drum and transferring them to a store at a first rate, and by extracting the stored signals at a different rate and applying them to a reproducing head exposing a photosensitive sheet on the drum. The resultant change in image line length around the drum periphery is accompanied by a dimensional change in the longitudinal direction of the drum produced by corresponding adjustment of the relative rates of movement of the analysing and reproducing heads with respect to the scanner drum, and a pulse generator functions to maintain the desired relationship between the drum rotation, the longitudinal movements of the analysing and reproducing heads, the rate of signal sampling and the rate of signal extraction from the store.

In preparation of printing plates for image reproduction, an electrooptical scanner is frequently used. This converts the light values of the image to be reproduced into electric signals and thus permits tone correction or colour correction, in the case of colour reproduction, to be carried out by electrical operations on these signals.

One particular convenient form of scanner is that employing cylinders to support the image to be reproduced and the light-sensitive layer to be exposed. Rotation of the cylinder in relation to an analysing system for the image to be reproduced and an exposing light source for the light-sensitive layer, will provide the necessary scanning motion in one direction; scanning in a direction perpendicular to the first can then be achieved by relative movement between the cylinder and the analysing and exposing systems in a direction parallel to the cylinder axis, and such relative movement can easily be obtained by rotating a lead screw supporting the cylinder or the analysing and exposing systems. Such a system does not, however, lend itself to enlargement or reduction of the original image, unless a cylinder of different diameter, selected in accordance with the required enlargement or reduction, is used to support the light-sensitive layer in order to stretch the image to the desired extent in the circumferential direction. Stretching in the direction parallel to the axis is, of course, varied quite simply by suitably adjusting the relative speeds of linear motion between the analysing and exposing systems and their cylinders.

The present invention is concerned with such a system, in which a cylinder or cylinders are mounted for rotation relative to the analysing and reproducing heads and receives the image and its reproduction, each on a cylindrical surface, the analysing and reproducing heads also undergoing relative longitudinal movement with respect to the image-carrying and reproduction-receiving surfaces so that the surfaces are scanned by the heads through the combination of the rotation and longitudinal movement. According to the invention, provision is made for varying the relationship between the relative longitudinal speed of the analysing head with respect to the image-carrying surface and the relative longitudinal speed of the reproduction-receiving surface with respect to the reproducing cylinder, to provide for selection of the degree of enlargement or reduction of the image in the longitudinal direction; in addition, there are means for transferring to a store signals derived from the analysing head and representing the instantaneous tonal value of the elemental image area which is being scanned, together with a reading device for extracting the signals from the store and applying them to the reproducing head to modulate a scanning spot and thereby to form a reproduction of the image on the reproduction-receiving surface; the rate of extracting the signals, relative to the rate of transferring them to the store, can be varied in accordance with the required degree of enlargement or reduction of the reproduced image in the circumferential direction of the cylinder.

In the preferred form of the invention the analogue voltage samples are applied to an analogue-to-digital converter which converts each signal amplitude into digital form so that they can be stored in a digital store. The signals extracted from the store at the desired reading rate are converted back into analogue form before application to the reproducing system. The digital store may conveniently take the form of a ferrite core store and the rate of sampling and the rate of reading from the store are preferably controlled from a high frequency "clock" source which also controls the rates of rotation of lead screws on which the analysing and exposing optics are mounted.

In order that the invention may be better understood, one example will now be described with reference to the accompanying drawings, in which.

Figure 1:
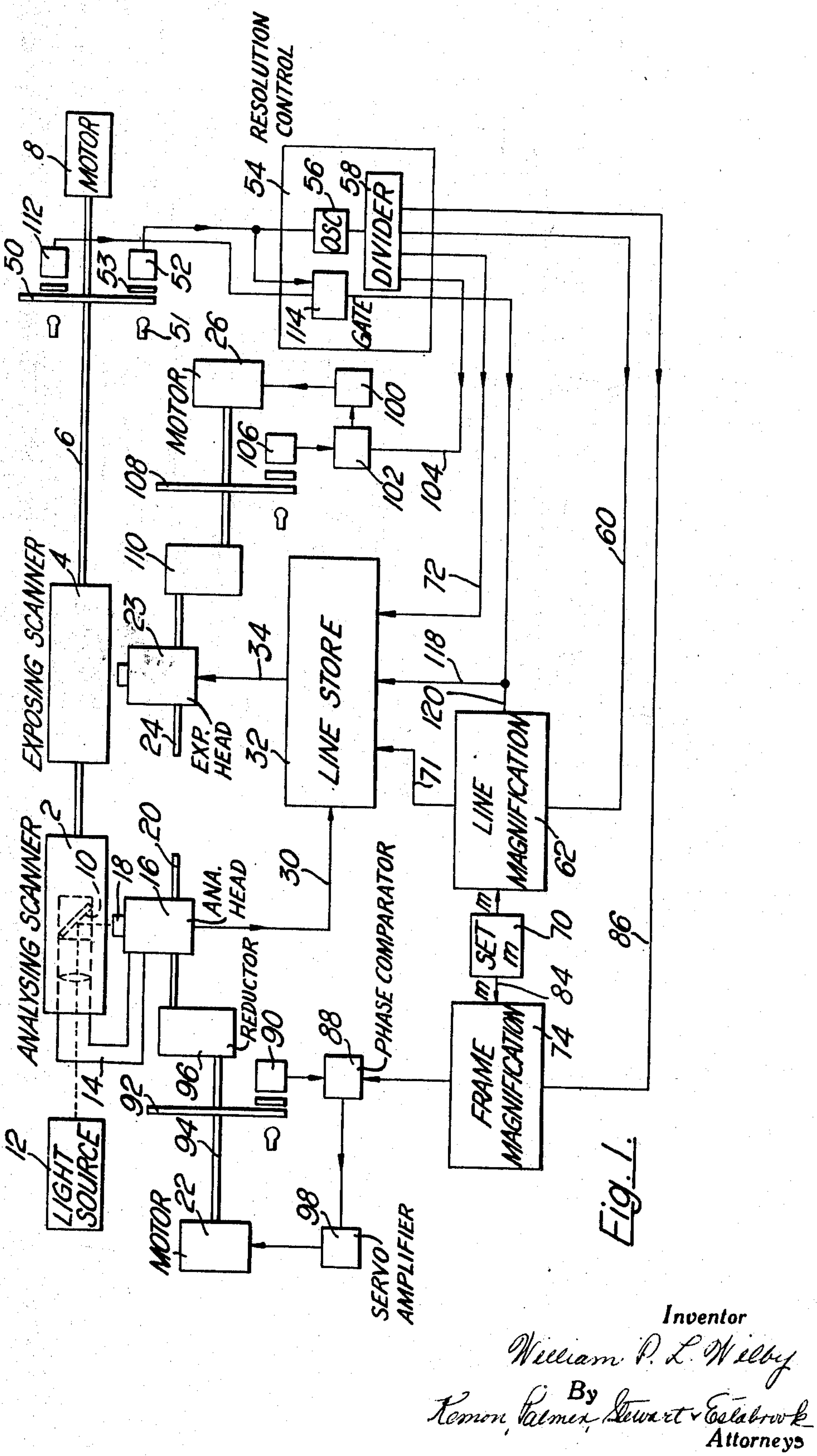
FIG. 1 is a block diagram of the apparatus as a whole.

In the apparatus shown in FIG. 1, the analysing drum 2 and the exposing drum 4 are mounted on the same shaft 6 driven by a motor 8. The transparency to be scanned is mounted on the analysing drum 2, within which there is a prism 10 for reflecting light from a lamp 12 through the transparency. The prism 10 is mounted by means of an arm 14 on an analysing head 16 containing a photomultiplier which views the transparency on the cylinder through a lens system 18 opposite the reflecting surface of the prism. Thus light from the lamp 12 reflected by the prism 10 through the transparency falls onto the photo-multiplier and causes it to generate electric signals having an amplitude corresponding to the intensity of the received light.

The analysing head is mounted on a lead screw 20 so that when this lead screw is rotated by the motor 22 the analysing head 16 and the reflecting prism 10 travel along the lead screw in a direction parallel to the shaft 6. This longitudinal motion of the anlysing head, together with the rotation of the shaft 6, cause the photo-multipliers to scan over the transparency on the analysing drum in a series of adjacent lines, one in each revolution of the shaft, until the whole transparency has been scanned.

The light-sensitive emulsion to be exposed is wrapped around the cylindrical exposing drum 4. The exposing head 23 contains a lamp which is modulated in accordance with the light values to be exposed onto successive elements of the rotating emulsion and is mounted on a lead screw 24 driven by a motor 26.

The signals from the photo-multiplier are applied over a conductor 30 to the line store 32 where they are written into the store as digital signals. The stored signals are read at a rate which may be different from the writing rate at the store input and are converted back into analogue form before being applied over line 34 to the exposing head 23.

Figure 2:
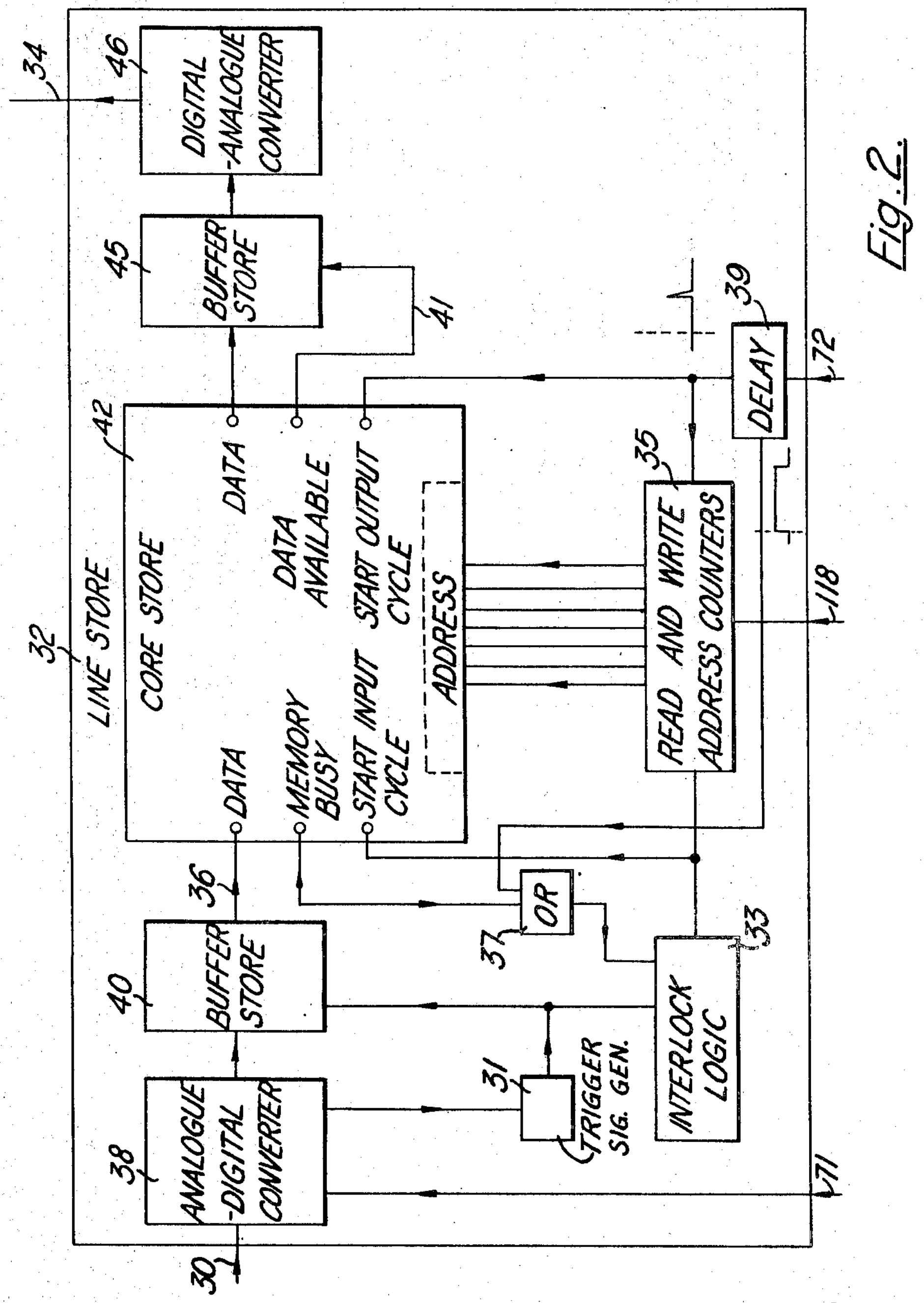
FIG. 2 shows the line store.

The line store is shown in greater detail in FIG. 2. It will be seen that the output of the analysing head is applied to an analogue-digital converter 38. The resulting digital signals are applied to a buffer store 40, from which they are transferred to the main store 42 which, in this example, has a capacity of 4096 words. The buffer store is a memory for one "word" from the converter 38 and holds this word until the core store is no longer being used for read-out, i.e., it enables the "read" operation to take precedence over the "write" operation. The writing operation is controlled in timing by an interlock sequence logic block 33. From the main store the digital signals are read into a buffer store 45, from which they pass to a digital-analogue converter 46, the analogue output signals of which are applied to the line 34. The sampling of the input signal is carried out at a rate high enough to define the waveform with sufficient precision for the required reproduction. The analogue-to-digital converter transforms each signal sample into a binary representation. This may, for example, consist of eight bits which together define 256 voltage levels. For enlargement, the reading of the information in the core store 42 takes place at a slower rate and consequently the analogue signal on the line 34 is stretched in time in comparison with the analogue signal from which the binary "word" was derived.

At the end of a revolution of the cylinders, the core store is again empty and is ready to start storing the next line of information from the picture. For each rotation of the cylinder, the analysing and exposing heads undergo a very small linear motion as a consequence of the simultaneous rotation of their lead screws. The relationship between the linear motion of the analysing head and that of the exposure head will depend upon the relationship between the pitch of their lead screws and the ratio of the rotational speeds of these lead screws. For corresponding enlargement in both directions of the transparency, the ratio of the linear movements of the analysing and exposing heads should be the same as that between the reading and writing speeds at the core store.

Returning to FIG. 1, the master synchronising pulses are generated from the rotation of the shaft 6 by means of a disc 50 having a radial grating and a photocell 52 which views a light source 51 on the other side of the disc through a fixed grating 53 and generates a pulse with the passage of each radial line of the disc 50. In this example, the pulses have a frequency of 27 kH. These pulses are applied to the resolution control 54 and serve as the synchronising input to a controlled oscillator unit 56. This controlled oscillator, which is of a type similar to that to be described in connection with the line and frame magnification, includes a phase comparator which receives the signals from the photocell 52 as well as signals from the controlled oscillator which have passed through a divider circuit. On the basis of the phase relationship between these two inputs, the phase comparator applies suitable controlling signals to the controlled oscillator.

The output of the controlled oscillator unit 56 is applied to a division selector 58 which includes selector switches and divider units and which has four output lines for the analysing and exposing line and frame synchronisation. By means of the selector switches the pulse rates of the signals applied to these lines can be modified in accordance with the resolution required, that is to say in accordance with the number of scanning lines required per inch.

Figure 3:
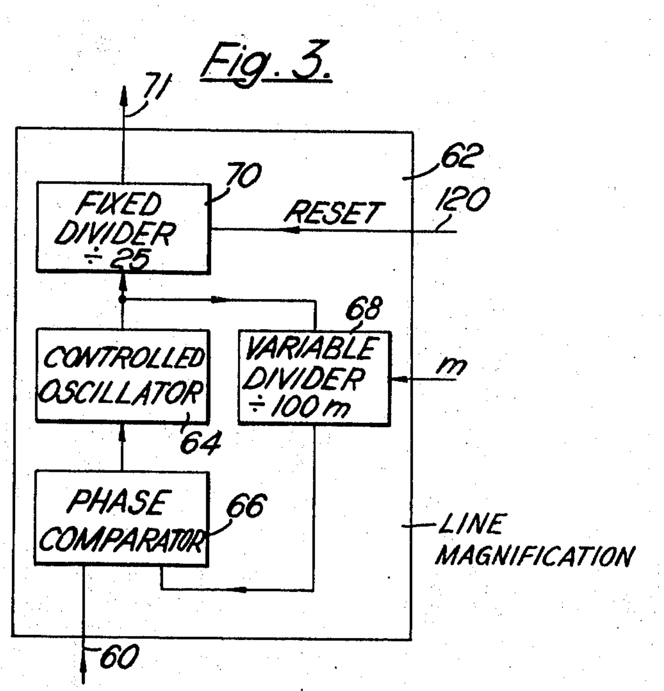
FIGS. 3 and 4 show the line and frame magnification circuits respectively.

The analysing line synchronising signal is applied by way of a line 60 to a line magnification unit 62, shown in greater detail in FIG. 3. The line magnification unit 62 includes an oscillator 64 controlled by a phase comparator 66 which receives the analysing line synchronising signal by way of the conductor 60 and also receives the output of a variable divider unit 68 fed with the output of the oscillator. A divider unit in the feedback connection causes the unit to act as a frequency multiplier. The divider unit 68 is connected to the enlargement control unit 70 (FIG. 1) and receives from the latter a signal *m* which determines the division factor 100*m* of the unit 68. The controlled oscillator may for example have a frequency of the order of 2 mH. and the signal on the analysing line synchronising conductor may have a repetition frequency of about 10 kH., varying with the setting of the resolution control. The oscillator output passes through a fixed divider circuit 70, effecting a division by 25, and is applied over line 71 to the "write" analogue-digital converter block 38 of the line store. A reset signal, the derivation of which will be explained later is applied over conductor 120 to the fixed divider 70. The effect of this is to reduce any phase error at the start of the line between the output of oscillator 64 and the master synchronising pulses to $\frac{1}{25}$ of a picture element. The signal applied to the block 38 controls the sampling rate, that is to say the rate at which the output of the analysing head is sampled for conversion to digital form.

The rate of reading information from the store and applying it to the exposing head is controlled by a signal derived from the resolution control 54 and applied by way of a conductor 72 to the delay 39.

The operation of the line store can now be described in greater detail. The ferrite core store 42 is manufactured by Ampex Limited of Reading under the designation Type RF1. It contains 4096 store locations, each capable of receiving eight bits of information. The analogue digital converter 38 receives a triggering signal over a line 71 when an input signal is to be converted to digital form. The converter 38 then sends a "busy" signal to a circuit 31 which generates a triggering signal at the end of the "busy" signal. This triggering signal is applied to the buffer store 40 and causes the digital signals from the converter 38 to be entered into the buffer store in parallel form. The same triggering signal is sent to an interlock logic circuit 33 which, if the core store 42 is not already busy, selects the "write" address counter in the counter circuit 35, adds one to the count, and also applies a starting signal to the "start input cycle" terminal of the core store itself. This causes the contents of the buffer store to be transferred in parallel manner to the core store over the line 36.

If the core store is busy, a "memory busy" signal is applied from the store through an OR gate 37 to the "wait" terminal of the interlock logic circuit 33. In such a case the transfer of data from the buffer store to the core store is delayed until the latter is no longer busy.

A reading operation is triggered by a signal on line 72, this signal being first applied to a delay circuit 39 having a delay period equal to the memory cycle time. This is a fixed time allocated for the writing of information into or the reading of information from a single location in the store. The delay pulse applied from the circuit 39 through the OR gate 37 to the interlock logic 33 locks out the latter circuit for one memory cycle time before the read-out cycle is commenced. This prevents a "writing" operation commencing just before a "reading" operation is due to start. At the end of the delay period a pulse is applied from the circuit 39 to the "start output cycle" terminal of the core store 42 and also to the counter circuits 35, where it selects the "read" address counter and adds one to the count. When the data in the specified location of the core store becomes available at the data output of the core store, a triggering pulse is applied from the core store over line 41 to the buffer store 45 and data is transferred in parallel manner to the buffer store where it is held until the next word is read out from the core store. The data in the buffer store controls the digital-analogue converter 46 and the resulting analogue signals from the latter constitute the output from the store which is applied by way of conductor 34 to the exposing head 23.

Figure 4:
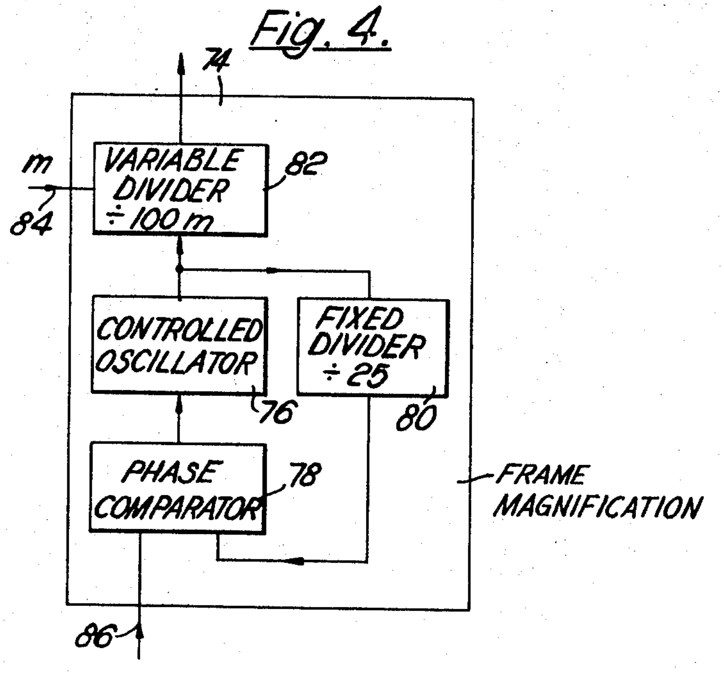

The stretching of the image in the direction of the shaft 6 is controlled by a frame magnification circuit 74 which is shown in greater detail in FIG. 4 and which is somewhat similar to the line magnification circuit shown in FIG. 3. It includes a controlled oscillator 76 and two dividers. However in this case the divider 80 in the feedback loop is a fixed divider and the divider 82 in the output line is the variable divider and is controlled by the enlargement control unit 70 by way of conductors 84. In the example being described, the controlled oscillator 76 had a frequency which could be varied about 750 kH. The phase comparator received from the resolution control over a line 86 a signal having a frequency which varied with the setting of the resolution control circuit but was of the order of 30 kH. The fixed divider circuit 80 had a ratio of 25 and the variable divider circuit 82 a ratio of 100 multiplied by the enlargement ratios specified by the signal on conductor 84. The effect of the frame magnification circuit is therefore that of the divider. The output of the variable divider 82 is applied to a phase locked servo system driving the motor 22. This includes a phase comparator and filter unit 88 which also receives pulses from a photo cell 90 before which pass radial slits in a disc 92. The disc 92 is mounted on a shaft 94 driven by the motor 22, the shaft 94 being connected to the shaft 20 through reduction gearing 96. The output of the phase comparator is applied to a servo amplifier 98 which energises the motor 22. Thus the frame magnification circuit specifies the rate of rotation of the lead screw 20. The lead screw 24 is rotated by the motor 26 which is energised by a servo amplifier 100. This is controlled by a phase comparator 102 which has two inputs, one from the exposure frame synchronising conductor 104, connected to the resolution control, and the other from a photo cell 106 generating pulses corresponding to the passage of radial lines in a disc 108. The motor 26 drives the lead screw 24 through reduction gearing 110. A suitable phase-locking servo unit can be obtained from Printed Motors Limited of Fleet, Hampshire (Type S15G). Such a unit containing the components 26 and 100 to 108. A similar unit can be used for the components 22 and 98 and 88 to 94.

Thus by setting the value *m* into the line magnification circuit 62 and the frame magnification circuit 74, the sampling rate and the speed of linear movement of the analysing head are defined, an increase in *m* tending to increase the sampling rate in the analyser and to reduce the speed of rotation of the lead screw 20. Their relationship with the reading rate and the speed of linear movement of the exposing head (both of which are independent of the factor *m*) gives the enlargement ratio.

Finally a further signal derived from a photo cell 112 in register with the circular path of a 15° sector track on the disc 50 is applied to a gate 114 which also receives the signal from the photocell 52. As a consequence there is generated a signal the trailing edge of which is locked to the master synchronising signal and this signal is applied as a blanking pulse by way of conductor 118 to the line store to reset address counters in the store and by way of conductor 120 to the line magnification unit, where it acts to reset the fixed divider, as described above, to define the line starting point.

To ensure that the sampling points in the reconstituted signal are equally spaced, the reading process should have priority over the writing process in the core store. This is achieved by the one-word memory buffer to hold the information which is to be written in the next store location, while the reading process is taking place.

Although the preceding description has been concerned with enlargement, it will be appreciated that the picture size can also be reduced with the apparatus described. In such a case, however, the core store should at the start of each rotation of the drum contain one line of information, which will be read out during the next rotation of the drum and replaced by a new line of information from the picture. Alternatively, read-out from the core store should be delayed such that the trailing edges of the original and the reproduction occur at the same angular positions on the cylinders. The picture can also, of course, be distorted in shape, if required, by varying the sampling rate during scanning or by providing different enlarging ratios in the axial and circumferential directions.

The invention can also be applied to digital computer systems for complete page makeup and phototype setting, or the signals derived can be applied as an input to a computer when it is necessary to carry out complicated digital processing of the video information.

Although in the above example a digital storage system is employed, it would also be possible to employ an analogue store. For example, an electronic commutator employing transistor switching circuits may be arranged to apply each voltage sample to a different capacitor, from which the samples are read out at the new speed and integrated to give a signal suitable for exposure control. The capacitors may conveniently be formed on a piece of silicon in "integrated circuit" form.

Although the invention has been described in connection with the reproduction of a monochrome image, it will be apparent that no essential change in the apparatus of the invention is necessary for the reproduction of colour printers from a colour transparency. For colour reproduction, the analysing head 16 includes three photomultipliers preceded by red, green and blue filters, respectively. These signals are applied to a colour correction and tonal correction computer which is known in itself and forms no part of the present invention. This colour and tonal correction computer provides three output signals representing the red, green and blue components of the original and a fourth output signal if a black printer is required. A selector switch permits any one of these signals to be applied to the line store to permit the preparation of a colour printer for the colour component selected by the switch.

Furthermore, the invention is not limited to the provision of a light-sensitive sheet on an exposing drum for photographic reproduction, since the reproduction image might be formed directly on the cylinder. As an example, the reproduced image might be formed on a selenium drum for xerographic reproduction or might even be engraved on a printing cylinder by a laser or an electron beam machining unit. Another possible modification of the apparatus described is to make the cylinders of different sizes. For example, if the average size modification required in the apparatus is an enlargement of three, the diameter of the exposing cylinder can be increased to three times that of the analysing cylinder, the driving units and logic circuits throughout the apparatus being correspondingly modified.

Finally, the size of the core store can be reduced to less than the number of locations required for a complete line by using the store in a recycling manner. As an example, if the store has a capacity of one half of a line, it can be filled in the first quarter of a revolution of the cylinders. Supposing that an enlargement of two is required, the reading operation can start at the same time as the writing operation but will take place at half the speed and consequently the reading operation will fall behind the writing operation and at the end of the first quarter revolution only the first half of the store will have been emptied. The writing operation can now commence again in this first half of the store, the input data being the second half of the line. In the meantime, the reading operation is extracting from the second half of the store the remaining information stored there during the first quarter revolution. The greater speed of the writing operation causes it to catch up with the reading operation at the end of the first half of the drum revolution so that at this point the first half line has been completely extracted from the store and the second half line has been inserted. In the remaining half cycle the reading apparatus reads out this second half line of information. Consequently, the whole line has been entered into and extracted from a core store having the capacity for half a line during one drum revolution. In addition, the writing of the complete line into the store takes place in a continuous manner during the first half of the drum revolution.

I claim:

1. Image reproduction apparatus permitting enlargement and reduction of an image, including an image-analysing head and a reproducing head; at least one cylinder mounted for rotation relative to the said analysing and reproducing heads, for receiving the said image and its reproduction, each on a cylindrical surface; driving means for obtaining relative longitudinal movement of the analysing and reproducing heads, respectively, with respect to the cylindrical image-carrying and reproduction-receiving surfaces, whereby the said surfaces are scanned by the analysing and reproducing heads through the combination of the rotation and the said relative longitudinal movement; the analysing head providing, during scanning, signals representing the instantaneous tonal value of the elemental area of the image which is being scanned; first adjusting means for varying the relationship between the relative longitudinal speed of the analysing head with respect to the image-carrying surface and the relative longitudinal speed of the reproducing head with respect to the reproduction-receiving surface, to select the degree of enlargement or reduction of the image in the longitudinal direction; means for sampling the image signals derived from the analysing head and for transferring them to a store; a reading device for extracting the signals from the store and applying them to the reproducing head thereby to form a reproduction of the image on the said reproduction-receiving surface; second adjusting means for varying the relationship between the rate of sampling the said signals, relative to the rate of extracting them from the store, in accordance with the required degree of enlargement or reduction of the reproduced image in the circumferential direction of said cylindrical surfaces; and pulse-generating means connected to apply clock pulses to maintain a predetermined relationship, once the said adjusting means have been set, between the rate of rotation of said cylindrical surfaces, the relative movement between the analysing head and the cylindrical image-carrying surface, the relative movement between the reproducing head and the cylindrical reproduction-receiving surface, the rate of sampling signals and transferring them to the store, and the rate of extracting signals from the store for application to the reproducing head; the said second adjusting means comprising a line magnification circuit, the line magnification circuit including a phase-locked oscillator of frequency higher than said pulse generating means, a phase comparator connected to receive pulses from the pulse generating means and connected to control the frequency of said oscillator, and a feedback circuit including a variable divider connected between the output of said oscillator and the input of said phase comparator to determine the output frequency of said oscillator.

2. Image reproduction apparatus permitting enlargement and reduction of an image, including an image-analysing head and a reproducing head; at least one cylinder mounted for rotation relative to the said analysing and reproducing heads, for receiving the said image and its reproduction, each on a cylindrical surface; driving means for obtaining relative longitudinal movement of the analysing and reproducing heads, respectively, with respect to the cylindrical image-carrying and reproduction-receiving surfaces, whereby the said surfaces are scanned by the analysing and reproducing heads through the combination of the rotation and the said relative longitudinal movement; the analysing head providing, during scanning, signals representing the instantaneous tonal value of the elemental area of the image which is being scanned; first adjusting means for varying the relationship between the relative longitudinal speed of the analysing head with respect to the image-carrying surface and the relative longitudinal speed of the reproducing head with respect to the reproduction-receiving surface, to select the degree of enlargement or reduction of the image in the longitudinal direction; means for sampling the image signals derived from the analysing head and for transferring them to a store; a reading device for extracting the signals from the store and applying them to the reproducing head thereby to form a reproduction of the image on the said reproduction-receiving surface; second adjusting means for varying the relationship between the rate of sampling the said signals, relative to the rate of extracting them from the store, in accordance with the required degree of enlargement or reduction of the reproduced image in the circumferential direction of said cylindrical surfaces; and pulse-generating means connected to apply clock pulses to maintain a predetermined relationship, once the said adjusting means have been set, between the rate of rotation of said cylindrical surfaces, the relative movement between the analysing head and the cylindrical image-carrying surface, the relative movement between the reproducing head and the cylindrical reproduction-receiving surface, the rate of sampling signals and transferring them to the store, and the rate of extracting signals from the store for application to the reproducing head; the first adjusting means including a frame magnification circuit comprising a phase-locked oscillator of frequency higher than the said pulse-generating means, a phase comparator connected to receive pulses from the said pulse-generating means and connected to said oscillator to control the frequency thereof, a feedback circuit including a fixed divider connected between an output of said oscillator and an input of the phase comparator, and a variable divider connected to receive the output of said oscillator and providing pulses for controlling said selected degree of enlargement or reduction of the image.

3. Image reproduction apparatus permitting enlargement and reduction of an image, including an image-analysing head and a reproducing head; at least one cylinder mounted for rotation relative to the said analysing and reproducing heads, for receiving the said image and its reproduction, each on a cylindrical surface; driving means for obtaining relative longitudinal movement of the analysing and reproducing heads, respectively, with respect to the cylindrical image-carrying and reproduction-receiving surfaces, whereby the said surfaces are scanned by the analysing and reproducing heads through the combination of the rotation and the said relative longitudinal movement; the analysing head providing, during scanning, signals representing the instantaneous tonal value of the elemental area of the image which is being scanned; first adjusting means for varying the relationship between the relative longitudinal speed of the analysing head with respect to the image-carrying surface and the relative longitudinal speed of the reproducing head with respect to the reproduction-receiving surface, to select the degree of enlargement or reduction of the image in the longitudinal direction; means for sampling the image signals derived from the analysing head and for transferring them to a store, the said means for sampling the image signals including means for filling at least one store location by applying thereto signal samples twice in one revolution of said cylindrical surfaces; a reading device for extracting the signals from the store and applying them to the reproducing head thereby to form a reproduction of the image on the said reproduction-receiving surface, the reading device including means for emptying each store location by extraction of a signal sample between the first and second store filling operations, the second filling operation taking place while the extraction of signals from other storage locations is still proceeding; second adjusting means for varying the relationship between the rate of sampling the said signals, relative to the rate of extracting them from the store, in accordance with the required degree of enlargement or reduction of the reproduced image in the circumferential direction of said cylindrical surfaces; and pulse-generating means connected to apply clock pulses to maintain a predetermined relationship, once the said adjusting means have been set, between the rate of rotation of said cylindrical surfaces, the relative movement between the analysing head and the cylindrical image-carrying surface, the relative movement between the reproducing head and the cylindrical reproduction-receiving surface, the rate of sampling signals and transferring them to the store, and the rate of extracting signals from the store for application to the reproducing head.

4. Apparatus in accordance with claim 3 in which the first store-filling operation takes place in the first quarter revolution and the second store-filling operation in the second quarter revolution of said cylindrical surfaces, the first signal extracting operation takes place in the first half revolution at half the speed of the store-filling operation, and the second signal extracting operation takes place in the second half revolution.

References Cited

UNITED STATES PATENTS 3,272,918 9/1966 Koll et al. -------- 178—6.7 X

RICHARD MURRAY, Primary Examiner

R. K. ECKERT, JR., Assistant Examiner

U.S. Cl. X.R.

178—6